May 30, 1950

J. E. CLARK ET AL 2,509,906

GLASS-TO-METAL SEAL

Filed March 13, 1942

INVENTORS J. E. CLARK
V. L. RONCI
BY
Walter C. Kiesel
ATTORNEY

May 30, 1950        J. E. CLARK ET AL        2,509,906
GLASS-TO-METAL SEAL

Filed March 13, 1942                                  2 Sheets—Sheet 2

INVENTORS   J. E. CLARK
                 V. L. RONCI
BY
        Walter C. Kiesel
               ATTORNEY Patented May 30, 1950

2,509,906

UNITED STATES PATENT OFFICE 2,509,906

GLASS-TO-METAL SEAL

James E. Clark, Williston Park, and Victor L. Ronci, Brooklyn, N. Y., assignors to Bell Telephone Laboratories, Incorporated, New York, N. Y., a corporation of New York Application March 13, 1942, Serial No. 434,520

4 Claims. (Cl. 49—92.5)

This invention relates to glass-to-metal seals in electron discharge devices and more particularly to seals for such devices of high efficiency in ultra-high frequency translating systems.

The usual lap-joint weld or seal, such as disclosed in United States Patent 1,294,466, issued February 18, 1919, to W. G. Houskeeper, involves the employment of a layer of glass in surface relation to a thin, flexible, knife-edge metallic portion joined to a vessel or tubular member forming a container or receptacle for discharge producing and controlling electrodes. Such seals are satisfactory to maintain an air-tight and hermetic condition in electronic discharge devices of large and small power rating but offer considerable resistance to ultra-high frequency currents particularly when the current is supplied to the device by coaxial conductors.

In other forms of lap-joint welds in which the metallic portion is of uniform thickness difficulties are likely to result due to skin tension strains which cause ruptures with consequent leakage resulting in damage to the device.

It is the primary object of this invention to produce highly efficient and hermetically tight sealed joints between vitreous material and metallic material having different temperature coefficients.

A further object of the invention is to completely control the compression and tension forces acting upon the sealed joint, whereby such forces are martialed and subjugated to increase the adhesion of the glass and metal surfaces to insure a perfectly sealed joint.

Another object of the invention is to increase the facility of the transmission of high frequency current in discharge devices to paths of low resistance and reactance.

These and other objects and advantages of this invention are realized in accordance with the various aspects of the invention in a glass-to-metal seal for electronic discharge devices involving a tubular metallic member of uniform wall thickness having a semi-toroidal mass of vitreous material hermetically sealed to the interior surface of the wall by centrifugal force, the mass being intermediate the ends of the tubular member so that the seal is always under compression forces from the exterior by the unrestricted wall surfaces on either end of the mass and the converging surfaces of the wall and mass being angularly related.

A feature of the seal construction contemplated in accordance with this invention eliminates the separate mass fused to the tubular wall whereby a tubular glass member may be arranged coaxial with the wall member and the extremity thereof adjacent the wall can be rendered plastic and centrifugally projected toward the metal wall surface to form the hermetic seal.

Another feature of the invention is concerned with the reinforced type seal, in which the seal as above described is provided with a ring of glass on the outer surface, the boundary thereof being limited to an area intermediate the extremities of the inner sealing mass.

Another feature of the invention relates to the construction of an electron discharge device of the ultra-high frequency power type employing a plurality of seal assemblies as above described. This involves a pair of tubular metallic members with internal centrifugal type seals joined to the ends of a self-heat radiating cylindrical anode having an opening along the axis thereof, the tubular members being cylindrically aligned to form extensions of the anode. A grid and a cathode are coaxially positioned within the opening of the anode, the grid being supported in one extension by a tubular conductor embodying a reinforced type seal joined to its respective extension and coaxial therewith and the cathode being supported by a similar tubular conductor carried by the adjacent tubular extension and provided with an axial conductor concentric with the tubular conductor and extension.

These and other features of the invention will be more clearly set forth in the following detailed description as applied to the drawings in which.

Figure 1:
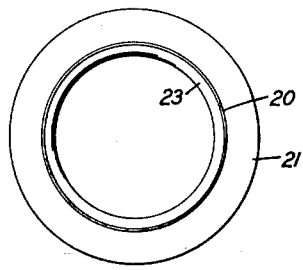
Fig. 1 is a plan view of the improved metal-to-glass seal made in accordance with this invention showing the annular vitreous element hermetically sealed to the inner surface of a metallic ring member.
Figure 2:
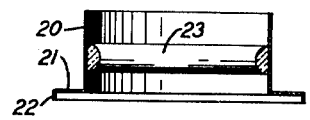
Fig. 2 is a side view of Fig. 1, in cross section, to illustrate the relationship and shape of the vitreous element with respect to the ring member.

Referring to the drawings and particularly to Figs. 1 and 2, the improved glass-to-metal seal made in accordance with this invention includes, in one form, a hollow metallic member, receptacle or shell 20, of uniform thickness, and preferably of copper or similar metallic material, capable of being easily wetted by glass to form a seal, the shell being of cylindrical form. As shown in certain embodiments of the seal, the shell has an annular flange portion 21 having a peripheral rim 22 extending therefrom. The shell is provided with an internal semi-toroidal mass 23, of vitreous material, such as glass, having different coefficients of expansion and contraction than the shell 20. The semi-toroidal mass of vitreous material is hermetically sealed to the interior surface of the shell intermediate the ends thereof so that the circular portions of the shell on opposite sides of the mass exert compression forces against the juncture edges of the mass in contact with the shell, while the tension forces in the mass maintain the glass in intimate contact with the shell portion which it covers. In order to utilize these forces, it is essential that the glass mass at the juncture surfaces, with respect to the shell surface, should be sufficiently thick so that the longitudinal and radial compression forces do not develop too high a skin tension strain on the opposite wall of the metal surface. The shape of the mass must be controlled so that thin layers of the glass mass are avoided at the terminations, since such seals tend to separate at the juncture point of the glass and metal due to incipient changes in temperature coefficients between these materials and eventually the initial separation progresses across the width of the mass, so that a leak is evident or the unsealed mass is subjected to greater compression stresses than it can stand, whereupon a fracture occurs. The semi-toroidal mass 23 forms a base to which an extension of any configuration may be fused for various purposes as hereinafter described.

Figure 3:
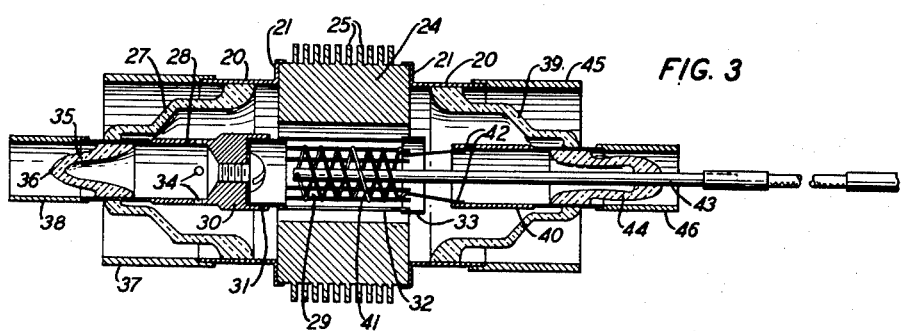
Fig. 3 illustrates an electron discharge device, in cross section, embodying the various forms of seals in accordance with this invention and showing the constructional features of the compact assembly due to the correlation of the seals and the electrodes.
Figure 5:
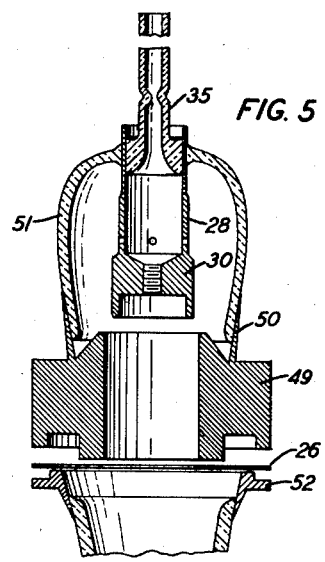
Fig. 5 is another modification, shown in cross section, of the combination type of seal employed with cooperating electrodes of an electron discharge device such as illustrated in Fig. 3.

The combined glass-to-metal seal as above described may be utilized specifically as shown in Fig. 3, in which various forms of the internal seal cooperate with elemental parts of an electronic discharge device to form a compact and a coaxially related structure. This device, which is designed primarily for generating power output of ultra-high frequency wave-length, comprises a triode having an anode formed of an intermediate solid block cylinder 24, preferably of copper, provided with a series of annular fins 25 formed integrally on the exterior surface of the block 24. A metallic shell 20 is hermetically sealed, in a suitable manner, to each end of the block with the flange 21 braised to the rim of the block by a tin-coated or electroplated gold ring 26, such as shown in Fig. 5, intermediate the flange and the block. An outwardly extending glass stem 27 is fused to the glass mass sealed to the interior of the shell 20 on one end of the device and the outer apertured end thereof is sealed to the exterior surface of an inner tubular metallic member 28, coaxial with the shell 20 adjacent thereto, the stem being sealed to an intermediate portion of reduced wall thickness. The tubular member 28 which serves as a cylindrical conductor for a control electrode or grid 29 is provided with an enlarged head 30 forming a recessed cup for a cup portion 31 of the grid which is attached within the recessed cup by a screw. The cup portion 31 carries a plurality of longitudinal wires 32 distributed around the boundary of the cup and the wires are held within the cylindrical boundary by a retaining band 33, on the opposite end thereof. The grid is therefore coaxially spaced from the inner wall of the block anode 24 and is rigidly supported from the tubular conductor 28.

The tubular conductor 28 is provided with spaced holes 34 adjacent the head 30, to facilitate the evacuation of the space within the device through a vitreous tubulation 35 sealed to the interior of the tubular conductor 28 over a greater area of the reduced wall thickness than the reinforcing ring of the stem 27, the tubulation being sealed off at 36 upon completion of the evacuation. The shell 20 and the tubular conductor 28 are provided with tubular extensions 37 and 38, respectively, of heavier wall thickness, to form rigid coaxial conductors for the respective electrodes and serve as protective means for the glass stem and tubulation respectively enclosed therewithin. The extensions are made separable to facilitate the formation of the seals on the interior of the members but, if desirable, the extensions may be made integral with the shell and conductor.

In the reinforced seal, as applied to the conductor 28, the inner seal is under compression forces in all directions while the metal is under tension and the radial tension forces imposed on the outer seal are neutralized by the equalized mass of the inner seal. A similar extension stem 39 is supported on the interior of the shell 20 on the opposite end of the anode and this stem is in turn sealed to the exterior mid-portion of a tubular conductor 40 axially aligned with the conductor 28 and coaxial with the shell 20. The tubular conductor 40 supports a double helical filamentary cathode 41, preferably of tungsten, which is coaxially mounted within the grid and anode and has its terminations secured to the inner end of the conductor 40 at 42. An axial conductor 43 extending through the tubular conductor 40, engages the bight of the double helical cathode and is welded thereto. The conductor 43 is sealed into the end of a glass tubulation 44, having the inner end hermetically sealed to the interior of the reduced portion of the conductor 40, the hermetic seal thereof extending over a greater area than the external reinforcing seal of the stem 39. The shell 20 and the conductor 40 are provided with coaxial extensions 45 and 46, respectively, in the same manner as described in connection with the opposite end of the device.

This construction provides a compact and highly efficient microwave power transmitting device in which the ultra-high frequency currents are supplied to the elements along direct longitudinal paths to the respective electrodes, and in which the output is efficiently transmitted over similar paths, and in which the input and output current carrying conductors are coaxially related to obtain the highest efficiency from the device. This result is achieved due to the construction of the novel glass-to-metal seals employed in this invention in which materials having greatly different temperature coefficients are hermetically sealed together by a seal construction which utilizes the compression forces of the material of greater expansion and the tension forces of the material of less expansion, whereby a highly efficient and permanently hermetic joint is secured. Furthermore, the various forces of the glass-to-metal seals are uniformly controlled to effect an air-tight seal in metal wall surfaces of uniform thickness in the class of metals having different temperature coefficients than the glass material.

Figure 4:
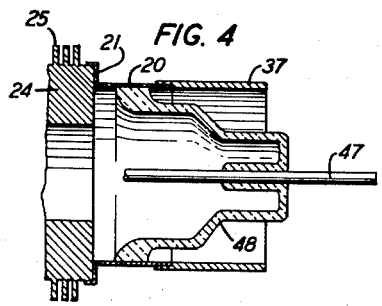
Fig. 4 is a partial view in cross section of a modified seal assembly which may be utilized in the structure of Fig. 3.

Another coaxial arrangement for the conductors of the device, shown in Fig. 3 may be produced by the construction, as shown in Fig. 4, in which an axial conductor 47 is sealed into the outer end of a glass stem 48 fused to the inner base seal on the shell 20.

A further modification is shown in Fig. 5 in which a cylindrical anode block 49 is provided with a Houskeeper seal 50 adjacent the anode and in which the glass bulb 51 is sealed to the exterior of a grid supporting tubular conductor 23. A cathode assembly may be supported from another glass bulb portion carried by a ring 52 which is hermetically sealed to the anode 49, in accordance with the method heretofore described.

Figure 6:
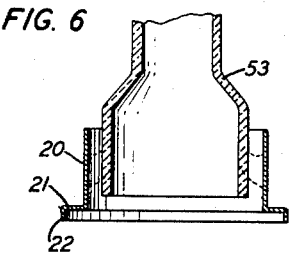
Fig. 6 illustrates another form of the glass-to-metal seal in cross section embodying the principles of the seal shown in Fig. 1.
Figure 7:
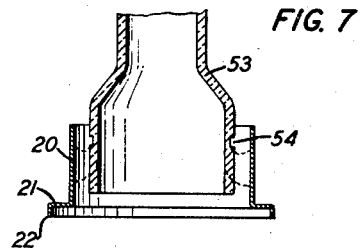
Fig. 7 is a cross-sectional view of a modification of the seal shown in Fig. 6.
Figure 8:
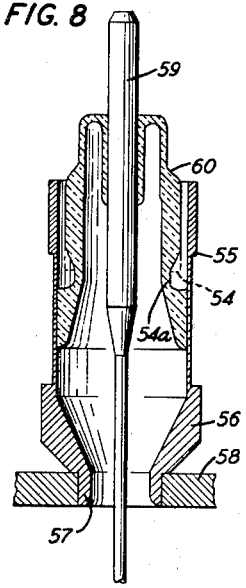
Fig. 8 illustrates, in cross section, a hermetically sealed terminal assembly for adaptation to electron discharge devices.

In the forms of seals heretofore described, the glass-to-metal seal is produced by forming a semi-toroidal glass mass or base within the shell portion and then joining a tubular glass member to the base to support associated elements. This procedure may be modified, as shown in Fig. 6, in which as glass tubular member 53 is coaxially positioned within the shell 20 and the terminating end within the shell is directly fused to the inner surface of the shell, as shown in dotted line, to form a flare joint or connection between the shell and the tubular glass member. A further modification of this type seal is shown in Fig. 7 in which the tubular glass member 53 is provided with an annual undercut portion or slot 54 prior to insertion in the shell, the glass between the slot and the end being rendered plastic and formed into a flare seal to contact the inner wall of the shell. The reduced diameter of the tubular member 53, due to the slot in the exterior surface, localizes the temperature gradient of the glass during the fusing and sealing operation and materially enhances the production of an efficient seal in accordance with the methods of this invention. The seals as above described may be utilized in the production of a terminal assembly, as shown in Fig. 8, in which a metallic shell member 55 having an enlarged head portion 56, terminating in a reduced diameter neck portion 57, is secured to a base 58, and a conductor 59, of larger diameter adjacent the seal than the portion extending through the base, is hermetically sealed to the shell by a glass tubular connection 60, which is hermetically sealed to the interior of the shell intermediate the ends thereof and the glass portion is provided with an annular slot 54 adjacent the inner seal. During the formation of the centrifugal seal, the glass member 60 is elongated to provide a thin flexible portion 54a interconnecting the seal and the glass member 60. The thin portion 54a of the glass which results due to the drawing out of the connection 60 after the centrifugal seal has been completed permits greater flexibility between the glass member and the metal, thus further reducing any tendency for the glass to lift away from the metal due to thermal changes.

The various forms of internal seals, as heretofore described, are produced in accordance with this invention, in which the plastic glass of centrifugally projected into contact with the metallic shell to form the highly efficient sealed joint. In brief, a glass ring is positioned within and in juxtaposition to the inner wall of the metal shell and the ring and shell are heated uniformly to render the glass plastic and to raise the shell to the temperature requisite for sealing. The ring and shell are rotated at high speed of the order of 2500 revolutions per minute so that because of centrifugal force, the glass is forced against the inner wall of the shell and in intimate contact therewith. The assembly then is rotated at a lesser rate, for example approximately 50 revolutions per minute, and the seal between the glass and metal heated to normalize it.

What is claimed is:

1. A glass-to-metal seal, comprising a tubular metallic shell, and a concentric tubular vitreous member positioned with respect to said shell, said member having a portion within the confines of said shell and the terminating end thereof being turned outwardly to form a flare seal in contact with the intermediate portion of said shell, said member having an external slot spaced from the end thereof within said shell.

2. A glass-to-metal seal, comprising a tubular metallic shell, a hollow vitreous member concentric with said shell and having a flare portion within said shell hermetically sealed thereto, said flare portion having a mass extending over an area of said surface intermediate the ends of said shell, a second vitreous member encompassing said shell and having a reenforcing ring portion sealed to the exterior of said shell at a medial position between the terminations of the interior mass seal, and a coaxial metallic shell surrounding said first shell and said second vitreous member, the latter having its outermost end sealed to the inner surface of said coaxial metallic shell.

3. An electron discharge device comprising a cylindrical external anode portion, tubular portions extending from opposite ends thereof, apertured vitreous stem portions extending outwardly from the interior surfaces of said tubular portions, axial tubular members supported by said stem portions and sealed thereto respectively, a cylindrical electrode supported by one of said axial tubular members and mounted within said anode portion, a cathode within said electrode and connected to said other tubular member, and vitreous plugs intermediate the inner ends of said axial tubular members and sealed thereto.

4. An electron discharge device, comprising a cylindrical external anode portion having heat radiating fins, coaxially aligned tubular extensions projecting from opposite ends of said anode portion, apertured vitreous stem portions extending outwardly from the interior surface of said tubular portions, axial tubular members supported by said stem portions and sealed thereto respectively, an open grid structure supported by one of said axial tubular members and mounted within said anode portion, a helical filamentary cathode within said grid and having the ends secured to said other tubular member, vitreous plugs intermediate the inner ends of said axial tubular members and sealed thereto, and a central conductor sealed through one of said plugs and having its inner end connected to said filamentary cathode.

JAMES E. CLARK.
VICTOR L. RONCI.

REFERENCES CITED

The following references are of record in the file of this patent:

UNITED STATES PATENTS

| Number | Name | Date |
|---|---|---|
| 1,844,936 | Hotchkins | Feb. 16, 1932 |
| 1,865,752 | Gabor | July 5, 1932 |
| 1,935,989 | Parker | Nov. 21, 1933 |
| 1,940,870 | Litton | Dec. 26, 1933 |
| 1,942,042 | Zimber et al. | Jan. 2, 1934 |
| 1,958,263 | Buechner | May 8, 1934 |
| 2,075,057 | Richardson | Mar. 30, 1937 |
| 2,198,007 | Gould | Apr. 30, 1940 |
| 2,200,694 | Gerecke et al. | May 14, 1940 |
| 2,345,278 | Monack | Mar. 28, 1944 |

FOREIGN PATENTS

| Number | Country | Date |
|---|---|---|
| 16,971 | Great Britain | of 1904 |
| 689,836 | France | June 2, 1930 |